TRANSISTORIZED MULTIVIBRATOR HAVING VERY GOOD STABILITY

Filed July 30, 1964

United States Patent Office 3,341,788
Patented Sept. 12, 1967

3,341,788
TRANSISTORIZED MULTIVIBRATOR HAVING VERY GOOD STABILITY

Hideya Nishioka, Kawasaki, Japan, assignor to Fujitsu Limited, Kawasaki, Japan, a corporation of Japan Filed July 30, 1964, Ser. No. 386,348
Claims priority, application Japan, July 30, 1963, 38/40,101
5 Claims. (Cl. 331—113)

My invention relates to a multivibrator. More particularly, the invention relates to a transistorized multivibrator circuit.

An object of the invention is to provide a new and improved multivibrator circuit.

Another object of the invention is to provide a multivibrator circuit having a stable oscillation frequency.

Still another object of the invention is to provide a multivibrator circuit of simple structure having a stable oscillation frequency.

In a multivibrator circuit of known type comprising transistors or vacuum tubes, the positive feedback circuit including the time constant circuit includes transistors or vacuum tubes, and when one circuit branch is in conductive condition the other circuit branch is in non-conductive condition. After the passing of a period of time determined by the time constant circuit, the circuit branch which is in conductive condition is changed to non-conductive condition and the circuit branch in non-conductive condition is changed to conductive condition, and by repetition, the circuit operates as an oscillator.

The inverse of the repetition period, which is the oscillating frequency, is determined by the value of the time constant circuit, the cut-off characteristic of the vacuum tube or the transistor, or by the power voltage, and is mostly influenced by the power voltage and the cut-off characteristic of the vacuum tube or transistor. When the multivibrator circuit utilizes a transistor, the change of the cut-off characteristic of the transistor due to change of temperature strongly influences the oscillating frequency and it becomes difficult to provide stable operation.

The purpose of the present invention is to eliminate the disadvantages of such known circuits and to provide a circuit exhibiting less oscillating frequency change due to ambient temperature or power or supply voltage.

In the circuit of the present invention, the oscillating frequency is chiefly determined by the value of the time constant circuit and is not influenced by the cut-off characteristic of the transistor or the vacuum tube or by the power voltage. Therefore, the stability of the oscillating frequency of the multivibrator of the invention is very good compared with the oscillating frequency stability of known types of multivibrators.

Figure 1:
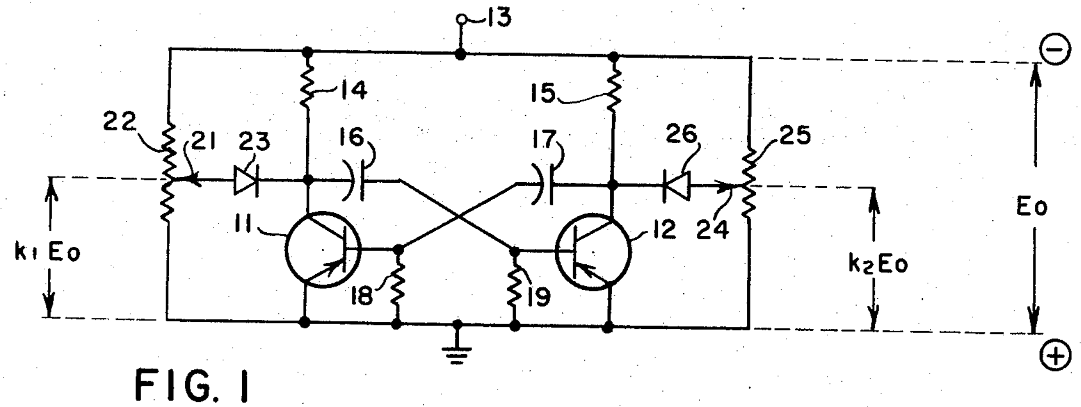
Figure 2:
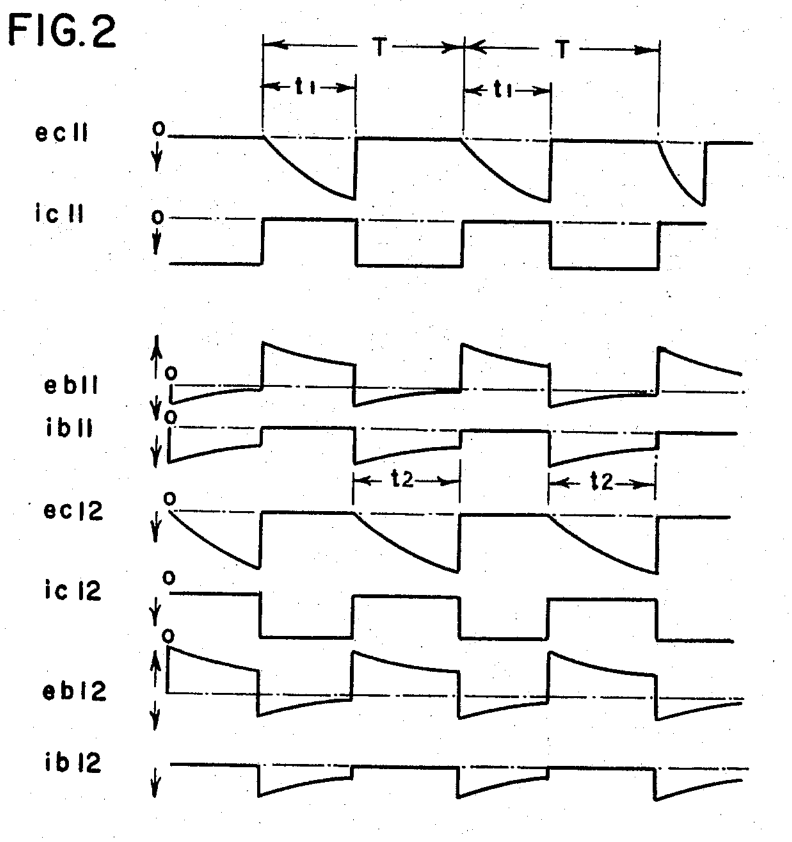

In order that the present invention may be readily carried into effect, it will now be described with reference to the accompanying drawing, wherein:

FIG. 1 is a circuit diagram of an embodiment of the multivibrator circuit of the present invention; and FIG. 2 is a series of graphical illustrations of wave shapes present in the embodiment of FIG. 1.

In FIG. 1, each of transistors 11 and 12 has an emitter electrode, a collector electrode and a base electrode. A voltage is applied to the collector electrode of the transistor 11 from the power terminal or input voltage supply terminal 13 through a resistor 14 and a voltage is similarly applied to the collector of the transistor 12 from the terminal 13 through a resistor 15.

The collector electrode of the transistor 11 is connected to the base electrode of the transistor 12 through condenser 16 and the collector electrode of transistor 12 is connected to the base electrode of transistor 11 through condenser 17. The base electrode of the transistor 11 is grounded by a resistor 18 and the base electrode of the transistor 12 is grounded by a resistor 19. The collector electrode of the transistor 11 is connected to an intermediate tap 21 of a resistance type potentiometer 22 through a diode 23 and the collector electrode of the transistor 12 is connected to an intermediate tap 24 of a resistance type potentiometer 25 through a diode 26.

In the circuit arrangement of FIG. 1, if the collector current of the transistor 11, for example, decreases, the voltage across the resistor 14 will drop and the collector voltage will increase. Thus, the condenser 16 is charged and by its charge current causes the base current of the transistor 12 to increase and the collector current of said transistor will also increase. As a result, the voltage drop across the resistor 15 will increase and the collector voltage of the transistor 12 will decrease. The condenser 17 will start discharging through the collector of the transistor 12 and the resistor 18 and the base current of the transistor 11 is reduced by the discharge current of the condenser 17. The collector current of the transistor 11 is therefore further decreased and the condenser 16 is charged further.

After repetition of these steps, the transistor 11 will reach its non-conductive or cut-off condition rapidly and the transistor 12 will reach its conductive condition. As a result, the condenser 16 is charged continuously from the supply terminal 13 through the resistor 14, but the transistor 12 is continuously kept in its conductive condition because the charge current of the condenser 16 will flow in the base of the transistor 12. In this case, the condenser 17 continues discharging through the resistor 18 and the collector of the transistor 12. Accordingly, the positive biased voltage is applied to the base of the transistor 11 by the voltage drop across the resistor 18 due to the discharging current of the condenser 17 and the transistor 11 is kept continuously in its non-conductive or cut-off condition.

Under these conditions, if the charging of the condenser 16 is continued and its terminal voltage becomes larger than the voltage of the potentiometer 22 between the tap 21 and ground, the diode 23 becomes conductive. When the diode 23 becomes conductive, the charging of the condenser 16 is stopped and the terminal voltage of said condenser, that is, the collector voltage of the transistor 11 is maintained at a potential $k1Eo$ of the tap 21 of the potentiometer 22, where $k1$ is a potential dividing ratio of said potentiometer.

Since the charge current becomes zero immediately when the charging of the condenser 16 is stopped, the transistor 12 will become non-conductive or cut off and the condenser 17 is charged from the power source through the resistor 15 and the base of the transistor 11. Due to the charge current of the condenser 17, the transistor 11 is in conductive condition continuously during the charging of said condenser and the condenser 16 will start discharging through the collector of the transistor 11 and the resistor 19.

Due to the voltage drop across the resistor 19 produced by the discharging current of the condenser 16, a reverse bias voltage is applied to the base of the transistor 12 and said transistor is continuously maintained in its cut-off or non-conductive condition. Under these conditions, if the charging of the condenser 17 is continued and the terminal voltage of said condenser becomes larger than the voltage of the potentiometer 25 between the tap 24 and ground, the diode 26 becomes conductive. When the diode 26 becomes conductive, the charging of the condenser 17 is stopped and its terminal voltage is maintained at a potential $k2Eo$ of the tap 24 of the potentiometer 25, where $k2$ is a potential dividing ratio of said potentiometer.

When the charging of the capacitor 17 is stopped, the transistor 11 will become cut off or non-conductive, as was the case of the capacitor 16, and the capacitor 16 will cause the transistor 12 to become conductive.

The described operation is repeated, and the transistors 11 and 12 will alternately be in conductive and non-conductive condition. The repetition period is the oscillating period of the multivibrator circuit.

If the time in which the transistor 11 starts to be conductive and then becomes cut off or non-conductive is $t1$, and the time in which the transistor 12 starts to be conductive and then becomes cut off or non-conductive is $t2$, then the oscillating period $T=t1+t2$.

As is known from the foregoing explanation of the operation of the circuit, $t1$ and $t2$ are the times in which the condensers 16 and 17 start and finish the charging.

The resistors 14 and 15 are selected at a sufficiently large resistance value compared with the resistors 19 and 18, and therefore $t1$ and $t2$ are given by the following formula:

$$Eo=\left[1-e^{-\frac{t1}{C16R14}}\right]\cong k1Eo$$

$$Eo=\left[1-e^{-\frac{t2}{C17R15}}\right]\cong k2Eo$$

Therefore, $$t1\cong C16R14\ \log_e\frac{1}{1-k1}$$

$$t2\cong C17R15\ \log_e\frac{1}{1-k2}$$

Accordingly, the oscillating period T is defined as $$T=t1+t2=C16R14\ \log_e\frac{1}{1-k1}+C17R15\ \log_e\frac{1}{1-k2}$$

where C16 is the capacitance of the condenser 16, R14 is the resistance of the resistor 14, C17 is the capacitance of the condenser 17 and R15 is the resistance of the resistor 15, $e$ being the base of the natural logarithm.

As indicated by the foregoing equation, the oscillating period of the multivibrator of the present invention is determined only by the capacitance 16, the capacitance 17, the resistance 14, the resistance 15, the potential ratio $k1$ of the potentiometer 22 and the potential ratio $k2$ of the potentiometer 25 and is not concerned with the power or supply voltage $Eo$ or the characteristics of the transistors 11 and 12. Practically, it is easy to reduce changes in the constancy of the resistances 14 and 15, the capacitances 16 and 17 and the ratios $k1$ and $k2$ due to temperature or time, and therefore the oscillating period T or the oscillating frequency, which is an inverse of the period, may be held to the same stability as the constancy of said resistances, capacitances and ratios.

Furthermore, far better oscillating frequency stability may be obtained with the multivibrator circuit of the present invention than with known multivibrators in which the oscillating frequency changes as a result of changes in the supply or power voltage or in the transistor characteristics.

FIG. 2 illustrates the wave forms of the multivibrator circuit of FIG. 1. In FIG. 2, the collector voltage *ec*11 of the transistor 11 and the collector current *ic*11 of said transistor are illustrated, as well as the base voltage *eb*11 and the base current *ib*11 of said transistor. Also illustrated are the collector voltage *ec*12 of the transistor 12 and the collector current *ic*12 of said transistor, as well as the base voltage *eb*12 and the base current *ib*12 of said transistor.

Although in the illustrated example of the circuit arrangement of the present invention, the charging will stop when the condensers 16 and 17 are charged and reach a determined voltage, the same result will be obtained in an embodiment of the circuit arrangement in which the discharging will stop when the condenser is discharged by a transistor and reaches a determined voltage. The same effect will also be obtained with the circuit arrangement of the invention when vacuum tubes are used instead of transistors. Furthermore, in these circuit arrangements it is possible to apply appropriate bias voltage to the base electrode of the transistor or to the grid of the vacuum tube.

While the invention has been described by means of a specific example and in a specific embodiment, I do not wish to be limited thereto, for obvious modifications will occur to those skilled in the art without departing from the spirit and scope of the invention.

I claim:

1. A multivibrator circuit arrangement, comprising first and second electronic switching devices each adapted to be biased to operative conditions determining a conductive condition and a non-conductive condition;

a source of supply voltage;

a first time constant circuit comprising a first resistor connecting said first switching device across said source of supply voltage and a first capacitor coupling said first switching device to said second switching device in a manner whereby said first capacitor is alternately charged and discharged and determines the operative condition of said first and second switching devices;

first control means connected across said source of supply voltage and coupled to said first capacitor, said first control means comprising a first potentiometer connected across said source of supply voltage and having a first tap determining from said supply voltage independently of the characteristics of said first and second switching devices a first substantially constant voltage ratio and a first diode coupling said first tap to said first capacitor, said first control means stopping the charging of said first capacitor when the voltage across the said first capacitor equals said first voltage ratio and switches said first diode to its conductive condition thereby reducing the charging current in said first capacitor, the voltage across said first capacitor remaining equal to said first voltage ratio;

a second time constant circuit comprising another resistor connecting said second switching device across said source of supply voltage and coupling said second switching device to said first switching device in a manner whereby said second capacitor is alternately charged and discharged and determines the operative condition of said first and second switching devices; and second control means connected across said source of supply voltage and coupled to said second capacitor, said second control means comprising a second potentiometer connected across said source of supply voltage and having a second tap determining from said supply voltage independently of the characteristics of said first and second switching devices a second substantially constant voltage ratio and a second diode coupling said second tap to said second capacitor, said second control means stopping the charging of said second capacitor when the voltage across the said second capacitor equals said second voltage ratio and switches said second diode to its conductive condition thereby reducing the charging current in said second capacitor, the voltage across said second capacitor remaining equal to said second voltage ratio and the operative condition of each of said first and second switching devices changing from one of its conductive and non-conductive conditions to the other of its conductive and non-conductive conditions, said multivibrator circuit arrangement having a period of oscillation determined by the conductivity condition of each of said first and second diodes and by the capacitance of said first and second capacitors, the resistance of said first and other resistors and the ratio of the voltages provided by said first and second control means.

2. A multivibrator circuit arrangement as claimed in claim 1, wherein when the charging of one of said first and second capacitors is stopped by its corresponding control means the operative condition of each of said first and second switching devices changes to the operative condition of the other during the charging of said one of said capacitors.

3. A multivibrator circuit arrangement as claimed in claim 1, wherein said first and second switching devices are transistors.

4. A multivibrator circuit arrangement, comprising first and second transistors each having emitter, collector and base electrodes;
a source of supply voltage;
resistance means connecting said first transistor across said source of supply voltage;
additional resistance means connecting said second transistor across said source of supply voltage;
a first capacitor coupling the collector and base electrodes of said first and second transistors;
first control means connected across said source of supply voltage and coupled to said first capacitor for controlling the voltage across said first capacitor, said first control means comprising a first potentiometer connected across said source of supply voltage and having a first tap determining from said supply voltage independently of the characteristics of said first and second transistors a first substantially constant voltage ratio and a first diode coupling said first tap to said first capacitor;
a second capacitor coupling the collector and base electrodes of said second and first transistors;
second control means connected across said source of supply voltage and coupled to said second capacitor for controlling the voltage across said second capacitor, said second control means comprising a second potentiometer connected across said source of supply and having a second tap determining from said supply voltage independently of the characteristics of said first and second transistors a second substantially constant voltage ratio and a second diode coupling said second tap to said second capacitor, said multivibrator circuit arrangement having a period of oscillation determined by the conductivity condition of each of said first and second diodes and by the capacitance of said first and second capacitors, the resistance of said resistance means and the ratio of the voltages provided by said first and second control means.

5. A multivibrator circuit arrangement, comprising
a first transistor having emitter, collector and base electrodes, an emitter-collector path and a collector-base path;
a second transistor having emitter, collector and base electrodes, an emitter-collector path and a collector-base path;
a source of supply voltage;
a first resistor connected in series with the emitter-collector path of said first transistor across said source of supply voltage;
a second resistor connected in series with the collector-base path of said first transistor across said source of supply voltage;
a third resistor connected in series with the emitter-collector path of said second transistor across said source of supply voltage;
a fourth resistor connected in series with the collector-base path of said second transistor across said source of supply voltage;
a first capacitor connected between the collector electrode of said first transistor and the base electrode of said second transistor and determining with said first resistor a first time constant;
a first potentiometer connected across said source of supply voltage and having a first tap determining from said supply voltage independently of the characteristics of said first and second transistors a first substantially constant voltage ratio and coupled by a first diode to said first capacitor for controlling the voltage across the said first capacitor;
a second capacitor connected between the collector electrode of said second transistor and the base electrode of said first transistor and determniing with said third resistor a second time constant; and
a second potentiometer connected across said source of supply voltage and having a second tap determining from said supply voltage independently of the characteristics of said first and second transistors a second substantially constant voltage ratio and coupled by a second diode to said second capacitor for controlling the voltage across the second capacitor, said multivibrator circuit arrangement having a period of oscillation which is determined by the conductivity condition of each of said first and second diodes and is the sum of said first and second time constants and is determined by the capacitance of said first and second capacitors, the resistance of said first and third resistors and the ratio of the voltages across said first and second potentiometers determined by their taps.

References Cited

UNITED STATES PATENTS

| | | | |
|---|---|---|---|
| 3,152,306 | 10/1964 | Cooper et al. | 331—113 |
| 3,178,658 | 4/1965 | Henrion | 307—88.5 X |
| 3,188,554 | 6/1965 | Reid | 307—88.5 X |
| 3,200,351 | 8/1965 | Ritchey | 331—113 X |
| 3,241,087 | 3/1966 | Gossel | 331—113 |

ARTHUR GAUSS, *Primary Examiner.*

J. JORDAN, *Assistant Examiner.*